US012600169B2

(12) United States Patent
Jie

(10) Patent No.: US 12,600,169 B2
(45) Date of Patent: Apr. 14, 2026

(54) WELDING SHAFT AND WHEEL ASSEMBLY FOR UNIVERSAL WHEEL, AND UNIVERSAL WHEEL

(71) Applicant: IF Health (Xiamen) Intelligent Technology Co., Ltd, Xiamen (CN)

(72) Inventor: Yebing Jie, Xiamen (CN)

(73) Assignee: IF Health (Xiamen) Intelligent Technology Co., Ltd, Xiamen (CN)

( * ) Notice: Subject to any disclaimer, the term of this patent is extended or adjusted under 35 U.S.C. 154(b) by 1004 days.

(21) Appl. No.: 17/044,372

(22) PCT Filed: Jan. 7, 2020

(86) PCT No.: PCT/CN2020/070730
§ 371 (c)(1),
(2) Date: Jul. 4, 2022

(87) PCT Pub. No.: WO2021/093149
PCT Pub. Date: May 20, 2021

(65) Prior Publication Data
US 2022/0332141 A1 Oct. 20, 2022

(30) Foreign Application Priority Data
Nov. 15, 2019 (CN) .......................... 201911122541.0

(51) Int. Cl.
*B60B 19/00* (2006.01)
*B23K 31/02* (2006.01)
(Continued)

(52) U.S. Cl.
CPC ............ *B60B 19/003* (2013.01); *B23K 31/02* (2013.01); *B60B 9/00* (2013.01); *B60B 19/12* (2013.01); *B60B 35/04* (2013.01); *B60B 2360/50* (2013.01)

(58) Field of Classification Search
CPC ..... B60B 19/003; B60B 19/12; B60B 19/125; B60B 9/00
See application file for complete search history.

(56) References Cited

U.S. PATENT DOCUMENTS 5,383,715 A * 1/1995 Homma ................ B60B 19/003
301/5.1
2002/0024250 A1 * 2/2002 Bandou ................. B60B 19/003
301/5.23
(Continued)

FOREIGN PATENT DOCUMENTS

| CN | 1435330 A | 8/2003 |
| CN | 107444008 A | 12/2017 |

(Continued)

*Primary Examiner* — S. Joseph Morano
(74) *Attorney, Agent, or Firm* — Bayramoglu Law Offices LLC

(57) ABSTRACT

The welding shaft for a universal wheel includes a big wheel welding shaft and a small wheel welding shaft, wherein the big wheel welding shaft includes a big wheel welding shaft body, a big wheel welding shaft retainer ring and a big wheel welding shaft fixing head which are sequentially assembled into a whole. The small wheel welding shaft includes a small wheel welding shaft body, a small wheel welding shaft retainer ring and a small wheel welding shaft fixing head which are sequentially assembled into a whole. The wheel assembly for a universal wheel includes a wheel shaft fixing plate, the welding shaft, a big wheel, and a small wheel. The universal wheel includes an outer protection plate, an outer fixing plate, a wheel shaft drive connector, multiple wheel assemblies, an inner fixing plate, an inner protection plate, and multiple shock absorption assemblies.

29 Claims, 8 Drawing Sheets

(51) Int. Cl.
B60B 9/00          (2006.01)
B60B 19/12         (2006.01)
B60B 35/04         (2006.01)

(56)                    References Cited

U.S. PATENT DOCUMENTS

| | | | | |
|---|---|---|---|---|
| 2006/0125309 A1* | 6/2006 | Huang | ................ | B60B 33/0039 |
| | | | | 301/5.23 |
| 2015/0115694 A1* | 4/2015 | Bando | .................... | B60B 19/12 |
| | | | | 301/5.23 |
| 2015/0130260 A1* | 5/2015 | Bando | .................. | B60B 19/003 |
| | | | | 301/5.23 |
| 2020/0047548 A1* | 2/2020 | Sugimoto | ............. | B60B 19/003 |
| 2020/0062031 A1* | 2/2020 | Murai | .................. | B60B 19/003 |

FOREIGN PATENT DOCUMENTS

| | | | |
|---|---|---|---|
| CN | 209051242 | U | 7/2019 |
| JP | 2010006352 | A | 1/2010 |
| JP | 2015105080 | A | 6/2015 |
| JP | 2016007860 | A | 1/2016 |
| TW | M572837 | U | 1/2019 |

* cited by examiner

WELDING SHAFT AND WHEEL ASSEMBLY FOR UNIVERSAL WHEEL, AND UNIVERSAL WHEEL

CROSS REFERENCE TO THE RELATED APPLICATIONS

This application is the national phase entry of International Application No. PCT/CN2020/070730, filed on Jan. 7, 2020, which is based upon and claims priority to Chinese Patent Application No. 201911122541.0, filed on Nov. 15, 2019, the entire contents of which are incorporated herein by reference.

TECHNICAL FIELD

The invention relates to a welding shaft, a wheel assembly comprising the same, and a universal wheel, in particular to a welding shaft and a wheel assembly for a universal wheel, and a universal wheel.

BACKGROUND

Existing wheelchairs and universal wheels have the following defects.

Wheelchairs are common medical equipment for assisting users having their limbs injured or having difficulty in moving in taking exercise, performing rehabilitation or participating in various social activities. Existing wheelchairs have the defects of being difficult to turn and having a large radius of rotation, and cannot turn freely in a narrow space, which severely affects the usage experience of users. In view of this, some novel universal wheels for wheelchairs are designed to replace common wheels to allow the wheelchairs to turn freely so as to improve the performance of the wheelchairs and improve the usage experience of the wheelchairs. However, such universal wheels have the following defects.

1. Wheels are important parts of mobile products. By means of an existing welding shaft, big wheels and small wheels can be distributed on the same circumference; however, the configuration of the welding shaft for the big wheels and the small wheels results in non-uniform stress, inaccurate turning and abrasion and is not beneficial to mass production.
2. Due to the lack of abrasion prompt signs of the existing universal wheel, users cannot make an accurate judgment as to whether or not a rubber wheel needs to be changed. The risks such as slipping may be caused if users fail to change the abraded rubber wheel in time; in addition, if the users change the rubber wheel too frequently due to their worry about the risks such as slipping, unnecessary waste may be caused.
3. Due to the lack of a damping structure in existing universal wheels, the axial torsion, moving stress and impact force generated during left or right turning are directly applied to all parts of the existing universal wheels, bumps may be caused by shakes of these parts, noises may be generated due to the friction and collision between these parts, and consequentially, the comfort of users is affected. The torsion, stress and impact force directly applied to the parts may damage these parts, and consequentially, the service life of the universal wheels is greatly shortened.
4. The welding shaft in a wheel assembly of the existing universal wheels is typically of a cylinder structure with a smooth surface. When a fixing plate is connected to the welding shaft, it is difficult to find out the central point of the welding shaft through positioning, so that the fixing plate welded and connected to the welding shaft may deviate from the center of the welding shaft, thus leading to non-uniform stress of left and right rubber wheels; or, the welding shaft may slide in the welding process, which makes welding insecure, and thus, potential quality hazard are caused.
5. Most universal wheels in the prior art are connected in a non-detachable manner such as through welding, which makes it impossible to disassemble the universal wheels. Due to the non-detachable structure, it will take a long time to assemble the universal wheels, it is impossible to maintain and change the parts separately, which is not beneficial to maintenance and leads to a series of potential safety hazards. Moreover, when one part is broken, the whole universal wheel cannot be used anymore and has to be changed, so that the economic cost is high, and waste is severe.

SUMMARY

The first technical issue to be settled by the invention is to provide a welding shaft for a universal wheel, which is more reasonable in layout, capable of realizing the distribution on the same circumference of a big wheel and a small wheel, uniform stress, smoother transition and more accurate turning, not prone to slipping, small in abrasion, long in service life, and capable of reducing production and maintenance costs.

To settle the first technical issue mentioned above, the invention provides a welding shaft for a universal wheel, which comprises a big wheel welding shaft and a small wheel welding shaft, wherein the big wheel welding shaft comprises a big wheel welding shaft body, a big wheel welding shaft retainer ring and a big wheel welding shaft fixing head which are sequentially assembled into a whole, and the small wheel welding shaft comprises a small wheel welding shaft body, a small wheel welding shaft retainer ring and a small wheel welding shaft fixing head which are sequentially assembled into a whole.

Optionally, the big wheel welding shaft body, the big wheel welding shaft retainer ring and the big wheel welding shaft fixing head are located on the same axis.

The small wheel welding shaft body, the small wheel welding shaft retainer ring and the small wheel welding shaft fixing head are located on the same axis.

The length of the big wheel welding shaft body is greater than that of the small wheel welding shaft body.

Optionally, the big wheel welding shaft retainer ring is in the shape of an incomplete circle.

The small wheel welding shaft retainer ring is in the shape of an incomplete circle.

Compared with the prior art, the welding shaft for a universal wheel of the invention has the following beneficial effects:

In this technical solution, the welding shaft comprises the big wheel welding shaft and the small wheel welding shaft, wherein the big wheel welding shaft comprises the big wheel welding shaft body, the big wheel welding shaft retainer ring and the big wheel welding shaft fixing head which are sequentially assembled into a whole, the small wheel welding shaft comprises the small wheel welding shaft body, the small wheel welding shaft retainer ring and the small wheel welding shaft fixing head which are sequentially assembled into a whole, and different wheels correspond to different shaft bodies, so that the layout is more reasonable, touchdown points of a big wheel and a small wheel are regularly distributed on the same circumference, stress is uniform, transition is smoother, turning is more accurate, slipping is unlikely to occur, abrasion is small, the service life is long, and production and maintenance costs are reduced.

The invention further provides a wheel assembly for a universal wheel. A welding shaft of the wheel assembly is more reasonable in layout, capable of realizing the distribution of a big wheel and a small wheel on the same circumference, uniform stress, smoother transition and more accurate turning, not prone to slipping, small in abrasion, long in service life, and capable of reducing production and maintenance costs.

The wheel assembly of the invention comprises a wheel shaft fixing plate, a big wheel, a small wheel, and the welding shaft for a universal wheel mentioned above, wherein a big wheel shaft fixing hole and a small wheel shaft fixing hole are formed in the surface of the wheel shaft fixing plate, are close to a head of the wheel shaft fixing plate and are distributed in a lengthwise direction of the wheel shaft fixing plate, the distance from the big wheel shaft fixing hole to the head of the wheel shaft fixing plate is greater than the distance from the small wheel shaft fixing hole to the head of the wheel shaft fixing plate, the big wheel welding shaft fixing head of the big wheel welding shaft is inserted into the big wheel shaft fixing hole from one surface of the wheel shaft fixing plate and is fixedly connected to the big wheel shaft fixing hole through welding, the small wheel welding shaft fixing head of the small wheel welding shaft is inserted into the small wheel shaft fixing hole small wheel shaft fixing hole from the other surface of the wheel shaft fixing plate and is fixedly connected to the small wheel shaft fixing hole through welding, the big wheel is connected to the big wheel welding shaft body of the big wheel welding shaft, and the small wheel is connected to the small wheel welding shaft body of the small wheel welding shaft.

Optionally, a lightening hole is formed in the surface of the wheel shaft fixing plate and is closed to a tail of the wheel shaft fixing plate.

Clamping grooves are symmetrically formed in two sides of the wheel shaft fixing plate and are close to the tail of the wheel shaft fixing plate.

The clamping grooves are rectangular.

Receding grooves which extend inwards are formed in two sides of the bottom of each clamping groove.

The big wheel welding shaft fixing head of the big wheel welding shaft is fixed to the wheel shaft fixing plate through welding.

The small wheel welding shaft fixing head of the small wheel welding shaft is fixed to the wheel shaft fixing plate through welding.

Optionally, the wheel shaft fixing plate is in the shape of an isosceles trapezoid.

The head of the wheel shaft fixing plate is arc.

Optionally, the big wheel is rotatably connected to the big wheel welding shaft body through a big wheel bearing.

The small wheel is rotatably connected to the small wheel welding shaft body through a small wheel bearing.

Optionally, the big wheel is connected to the big wheel welding shaft body in a riveted manner through the big wheel bearings.

The small wheel is connected to the small wheel welding shaft body in a riveted manner through the small wheel bearings.

Optionally, a big wheel fixing threaded hole is formed in the center of an end face of the big wheel welding shaft body.

A small wheel fixing threaded hole is formed in the center of an end face of the small wheel welding shaft body.

The big wheel fixing threaded hole is matched with a corresponding big wheel fixing screw to fix the big wheel.

The small wheel fixing threaded hole is matched with a corresponding small wheel fixing screw to fix the small wheel.

Optionally, the diameter and length of the big wheel are greater than those of the small wheel.

Optionally, abrasion prompt signs are disposed on the big wheel and the small wheel.

Optionally, anti-slip grooves are formed in an outer surface of the big wheel and an outer surface of the small wheel, and the abrasion prompt signs are disposed in the anti-slip grooves.

Optionally, the abrasion prompt signs are protrusions which are located in the anti-slip grooves and stretch out from bottom surfaces of the anti-slip grooves in a radial direction, and the height of the protrusions is half of the depth of the anti-slip grooves.

Optionally, multiple anti-slip grooves are formed in each of the big wheel and the small wheel, and multiple abrasion prompt signs are disposed in each anti-slip groove; the number of the abrasion prompt signs in each anti-slip grooves is equal to that of the abrasion prompt signs in the other anti-slip grooves; and the abrasion prompt signs are uniformly distributed in the anti-slip grooves.

Optionally, the big wheel and the small wheel are rubber wheels.

Compared with the prior art, the wheel assembly of the invention has the following beneficial effects:

In this technical solution, the wheel assembly of the invention comprises the wheel shaft fixing plate, the big wheel, the small wheel, and the welding shaft for a universal wheel, wherein the big wheel shaft fixing hole and the small wheel shaft fixing hole are formed in the surface of the wheel shaft fixing plate, are close to the head of the wheel shaft fixing plate and are distributed in the lengthwise direction of the wheel shaft fixing plate, the distance from the big wheel shaft fixing hole to the head of the wheel shaft fixing plate is greater than the distance from the small wheel shaft fixing hole to the head of the wheel shaft fixing plate, the big wheel welding shaft fixing head of the big wheel welding shaft is inserted into the big wheel shaft fixing hole from one surface of the wheel shaft fixing plate and is fixedly connected to the big wheel shaft fixing hole through welding, the small wheel welding shaft fixing head of the small wheel welding shaft is inserted into the small wheel shaft fixing hole small wheel shaft fixing hole from the other surface of the wheel shaft fixing plate and is fixedly connected to the small wheel shaft fixing hole through welding, the big wheel is connected to the big wheel welding shaft body of the big wheel welding shaft, and the small wheel is connected to the small wheel welding shaft body of the small wheel welding shaft; different wheels corresponds to different shaft bodies, and the distance from the big wheel shaft fixing hole to the head of the wheel shaft fixing plate is greater than the distance from the small wheel shaft fixing hole to the head of the wheel shaft fixing plate, so that the welding shaft of the wheel assembly is more reasonable in layout, touchdown points of the big wheels and the small wheels are regularly distributed on the same circumference, stress is uniform, transition is smoother, turning is more accurate, slipping is unlikely to occur, abrasion is small, the service life is long, and production and maintenance costs are reduced.

The invention further provides a universal wheel. Welding shafts of the universal wheel are more reasonable in layout, capable of realizing the distribution on the same circumference of big wheels and small wheels, uniform stress, smoother transition and more accurate turning, not prone to slipping, small in abrasion, long in service life, and capable of reducing production and maintenance costs.

The universal wheel of the invention comprises an outer protection plate, an outer fixing plate, an inner fixing plate, an inner protection plate, a wheel shaft drive connector, multiple wheel assemblies and multiple shock absorption assemblies, wherein the wheel shaft drive connector is connected to the multiple wheel assemblies through the outer fixing plate, the inner fixing plate and the multiple shock absorption assemblies, the outer protection plate is fixed to an outer side of the outer fixing plate, the inner protection plate is fixed to an inner side of the inner fixing plate, and each of the multiple wheel assemblies is the wheel assembly for a universal wheel mentioned above.

Optionally, the multiple wheel assemblies are regularly disposed around the wheel shaft drive connector.

The multiple big wheels and the multiple small wheels are disposed alternately.

Optionally, touchdown points of the multiple big wheels and the multiple small wheels are located on the same circumference. Optionally, the multiple shock absorption assemblies are regularly disposed in a circumferential direction of the wheel shaft drive connector.

Each shock absorption assembly comprises a shock-proof component and a limiting component, wherein the limiting component for restraining the shock-proof component from moving is disposed on a side, away from the wheel shaft drive connector, of the shock-proof component.

Optionally, the shock-proof component comprises a sponge cushion and a sponge support, wherein the sponge cushion is fixedly connected to the sponge support.

Optionally, the sponge cushion is of an arc block structure, and the curvature of an inner side of the sponge cushion is equal to that of an outer side of the sponge cushion.

Optionally, a main part of the sponge support is of an arc plate structure, the curvature of an inner side of the sponge support corresponds to the curvature of an outer side of the sponge cushion, and the outer side of the sponge cushion is attached to the inner side of the sponge support; protruding edges which protrude towards the inner side of the sponge support are disposed at two ends of the sponge support and include a left protruding edge disposed at a left end of the sponge support and a right protruding edge disposed at a right end of the sponge support; an angle between the left protruding edge and the main part of the sponge support corresponds to an angle between the outer side of the sponge cushion and a left side of the sponge cushion, and an angle between the right protruding edge and the main part of the sponge support corresponds to an angle between the outer side of the sponge cushion and a right side of the sponge cushion; the inner side of the left protruding edge of the sponge support is attached to the left side of the sponge cushion, and the inner side of the right protruding edge of the sponge support is attached to the right side of the sponge cushion; the sponge cushion is clamped on the sponge support.

Optionally, multiple shock absorption grooves are regularly formed in the peripheral side of the wheel shaft drive connector; the multiple sponge cushions are clamped in the multiple shock absorption grooves in a one-to-one corresponding manner, bottom surfaces of the shock absorption grooves are consistent with the inner sides of the sponge cushions in curvature and correspond to the inner sides of the sponge cushions in size, and left walls the shock absorption grooves are consistent with the left sides of the sponge cushions in gradient and correspond to the left sides of the sponge cushions; the sponge cushions are in interference fit with the shock absorption grooves.

Optionally, anti-shake protrusions are disposed on the bottom surfaces of the shock absorption grooves, anti-shake grooves are formed in the inner sides of the sponge cushions, and the anti-shake protrusions are clamped in the anti-shake grooves.

Optionally, a fixing plate groove is formed in the outer side of each sponge support.

Tails of the multiple wheel shaft fixing plates are inserted into the fixing plate grooves in a one-to-one corresponding manner.

Optionally, the outer fixing plate is detachably connected to the wheel shaft drive connector, and the inner fixing plate is detachably connected to the wheel shaft connector; the shock-proof components are disposed between the outer fixing plate and the inner fixing plate.

The limiting components are fixed between the outer fixing plate 2 and the inner fixing plate.

Optionally, the limiting components are limiting bolts or limiting rods.

Each shock-proof component comprises a sponge cushion and a sponge support, wherein columnar protrusions are disposed on an outer side of the sponge support, and each sponge support comprises four columnar protrusions; every two columnar protrusions are paired, one pair of columnar protrusion is disposed at a left end of the sponge support, the other pair of columnar protrusion is disposed at a right end of the sponge support, and the two pairs of columnar protrusions are symmetrical; the distances between the two columnar protrusions in all the pairs are consistent, the two columnar protrusions in each pair are parallel to each other, and an arc surface is formed between opposite sides of the two columnar protrusions in each pair and has an inner diameter corresponding to an outer diameter of the limiting bolts or the limiting rods.

Through holes are formed in the outer fixing plate and correspond to the limiting bolts or the limiting rods, and through holes are formed in the inner fixing plate and correspond to the limiting bolts or the limiting rods.

The limiting bolts or the limiting rods sequentially penetrate through the through holes in the outer fixing plate and the through holes in the inner fixing plate and are surrounded by the arc surfaces.

Optionally, circular through holes are formed in the center of the outer fixing plate and in the center of the inner fixing plate, and the inner diameter of the circular through holes corresponds to the outer diameter of a main part of the wheel shaft drive connector; the outer fixing plate is clamped and connected to the wheel shaft drive connector, and the inner fixing plate is clamped and connected to the wheel shaft drive connector; the wheel shaft drive connector, the outer fixing plate and the inner fixing plate are arranged coaxially.

Optionally, the outer fixing plate and the inner fixing plate are clamped in the clamping grooves in the two sides of the wheel shaft fixing plates.

Compared with the prior art, the universal wheel of the invention has the following beneficial effects:

In this technical solution, the universal wheel comprises the outer protection plate, the outer fixing plate, the wheel shaft drive connector, the multiple wheel assemblies, the inner fixing plate, the inner protection plate, and multiple shock absorption assemblies, wherein the wheel shaft drive connector is connected to the multiple wheel assemblies through the outer fixing plate, the inner fixing plate and the multiple shock absorption assemblies, the outer protection plate is fixed to the outer side of the outer fixing plate, the inner protection plate is fixed to the inner side of the inner fixing plate, and each of the multiple wheel assemblies is the wheel assembly for a universal wheel mentioned above; different wheels correspond to different shaft bodies, and the distance from the big wheel shaft fixing hole to the head of the wheel shaft fixing plate is greater than the distance from the small wheel shaft fixing hole to the head of the wheel shaft fixing plate, so that the welding shaft of the wheel assembly is more reasonable in layout, touchdown points of the big wheels and the small wheels are regularly distributed on the same circumference, stress is uniform, transition is smoother, turning is more accurate, slipping is unlikely to occur, abrasion is small, the service life is long, and production and maintenance costs are reduced.

BRIEF DESCRIPTION OF THE DRAWINGS

To explain the technical solutions of the specific embodiments of the invention or the prior art more clearly, accompanying drawings required for the description of the specific embodiments of the invention or the prior art are briefly introduced below. The drawings in the following description are merely for some embodiments of the invention, and those ordinarily skilled in the art can obtain other drawings according to the following ones without creative labor.

Those ordinarily skilled in the art can easily appreciate other advantages and beneficial effects of the invention with reference to the detailed description of preferred embodiments below. Obviously, the accompanying drawings are merely for the purpose of illustrating the preferred embodiments of the invention, and should not be construed as limitations of the invention. In all these drawings, identical reference signs represent identical components. Wherein.

REFERENCE SIGNS

Figure 1:
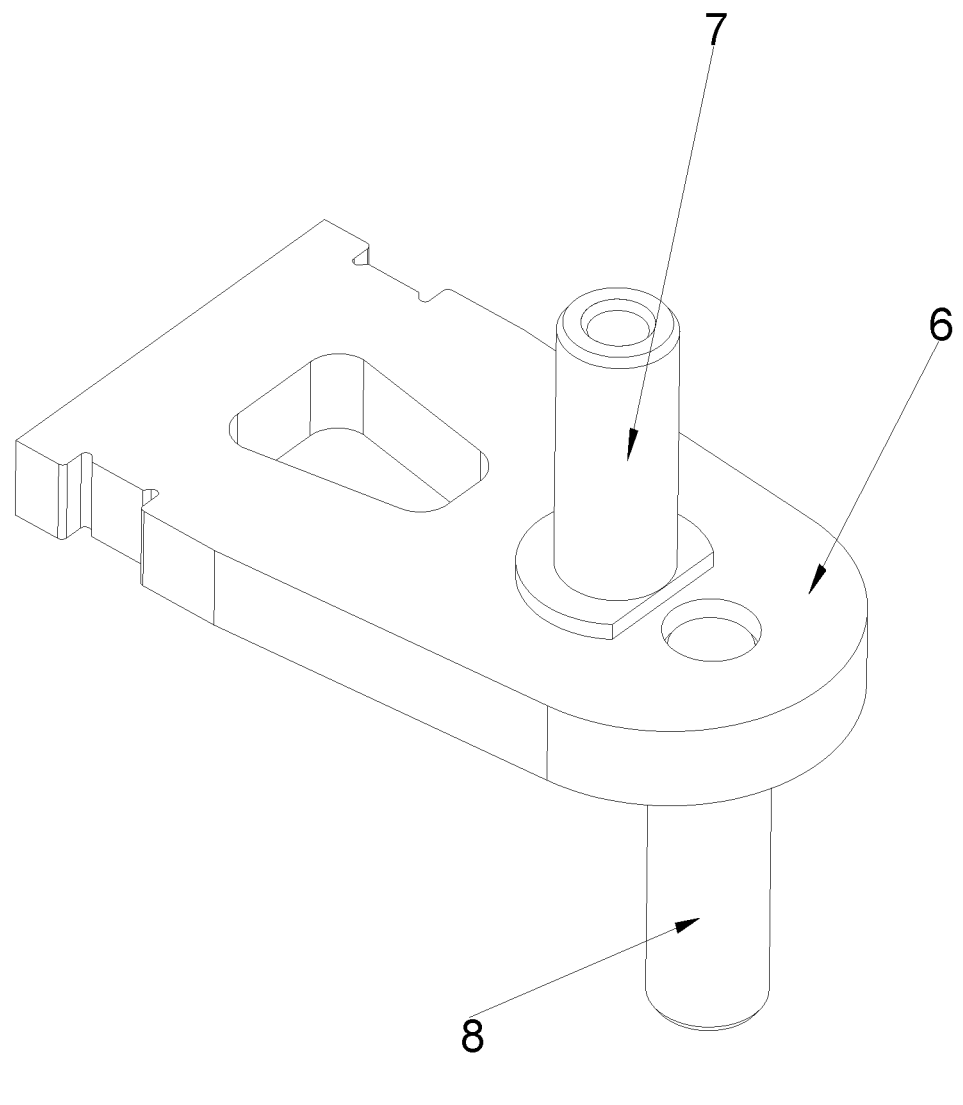
FIG. 1 is a structural diagram of a welding shaft for a universal wheel in an embodiment of the invention.

1, outer protection plate;

2, outer fixing plate; 201, through hole; 202, circular through hole;

3, wheel shaft drive connector; 301, shock absorption groove; 302, anti-shake protrusion;

4, big wheel; 401, big wheel bearing; 402, abrasion prompt sign; 403, anti-slip groove;

5, small wheel;

6, wheel shaft fixing plate; 601, big wheel shaft fixing hole; 602, small wheel shaft fixing hole; 603, lightening hole; 604, clamping groove; 605, receding groove;

7, big wheel welding shaft; 701, big wheel welding shaft body; 702, big wheel welding shaft fixing head; 703, big wheel welding shaft retainer ring; 704, big wheel fixing threaded hole;

8, small wheel welding shaft; 801, small wheel welding shaft body; 802, small wheel welding shaft fixing head; 803, small wheel welding shaft retainer ring; 804, small wheel fixing threaded hole;

9, inner fixing plate; 10, inner protection plate; 11, shock absorption assembly;

12, anti-shock component; 121, sponge cushion; 122, sponge support; 1211, anti-shake groove; 1221, protruding edge; 1222, fixing plate groove; 1223, columnar protrusion; 13, limiting component.

DETAILED DESCRIPTION OF THE EMBODIMENTS

A further detailed description of illustrative embodiments of the disclosure will be given below with reference to the accompanying drawings. It would be appreciated that although the illustrative embodiments of the disclosure are shown by these accompanying drawings, the disclosure can be implemented in other forms without being limited by those ones described herein. These embodiments are provided to gain a deeper understanding of the disclosure and to completely convey the scope of the disclosure to those skilled in the art.

It should be appreciated that the terms in this text are merely for the purpose of describing specific illustrative embodiments, and are not intended to limit the invention. Unless otherwise clearly specified, terms in singular form such as "an", "one" and "said" may also be in plural form. Terms such as "comprise", "include", "has (have)" and "provided with" inclusively indicate the existence of a feature, a step, an operation, an element and/or a component referred to, but do not exclude the possibility of the existence or addition of one or more other features, steps, operations, elements, components and/or other combinations. Unless an execution sequence is clearly specified, the steps, processes and operations of the method in the description do not have to be executed in a specific sequence described or explained below. It should also be noted that other or alternative steps can be adopted.

Terms such as "first", "second" and "third" are used to describe multiple elements, components, regions, layers and/or parts in this text, but these elements, components, regions, layer and/or parts should not be limited by these terms. These terms may also be used to distinguish one element, component, region, layer or part from another one. Unless otherwise clearly specified, the terms such as "first" and "second" and other numerical terms used in this text do not imply any sequence or order, so that first element, component, region, layer or component discussed below may also be referred to as second element, component, region, layer or part without departing from the spirit of the embodiments of the invention.

To facilitate the description, spatial relational terms such as "interior", "exterior", "inner side", "outer side", "lower side", "below", "upper side", "above" may be used in the text to illustrate the relationship of one element or feature with respect to another one. These spatial relational terms are intended to include other orientations of a device in use or operation, in addition to those illustrated in the drawings. For example, if a device in the drawings is turned upside down, an element described as "being located on the lower side of the other element or feature" or "being located below the other element or feature" should be oriented as "being located on the upper side of the other element or feature" or "being located above the other element or feature". Thus, the illustrative term "below" includes the orientation of "above" as well as the orientation of "below". The device may also be re-orientated (such as by being rotated by 90° or to other directions), and corresponding explanations shall be given with spatial relative relation descriptors in this text.

Figure 2:
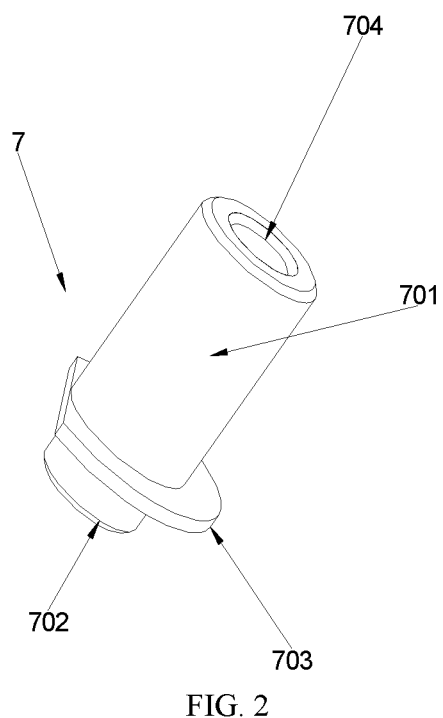
FIG. 2 is a structural diagram of a big wheel welding shaft of the welding shaft for a universal wheel in the embodiment of the invention.
Figure 3:
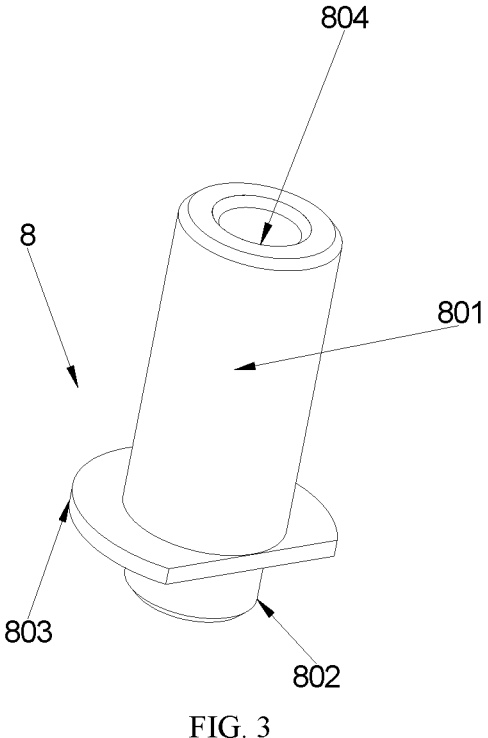
FIG. 3 is a structural diagram of a small wheel welding shaft of the welding shaft for a universal wheel in the embodiment of the invention.
Figure 4:
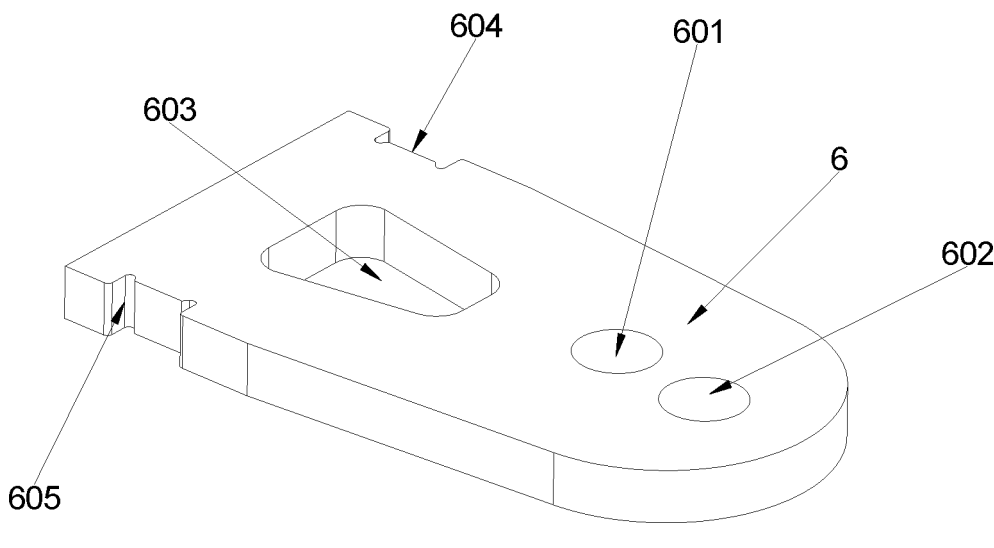
FIG. 4 is a structural diagram of a wheel shaft fixing plate of the welding shaft for a universal wheel in the embodiment of the invention.
Figure 5:
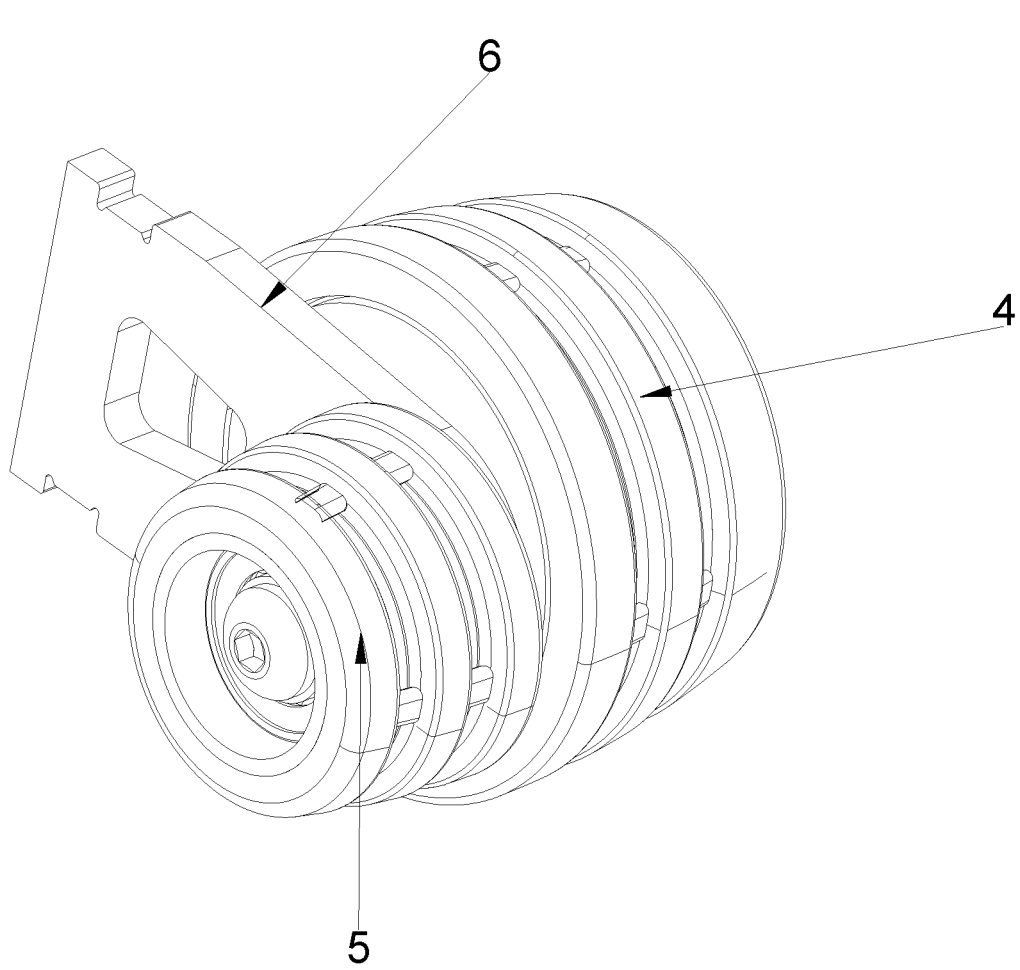
FIG. 5 is a structural diagram of a wheel assembly in the embodiment of the invention.
Figure 6:
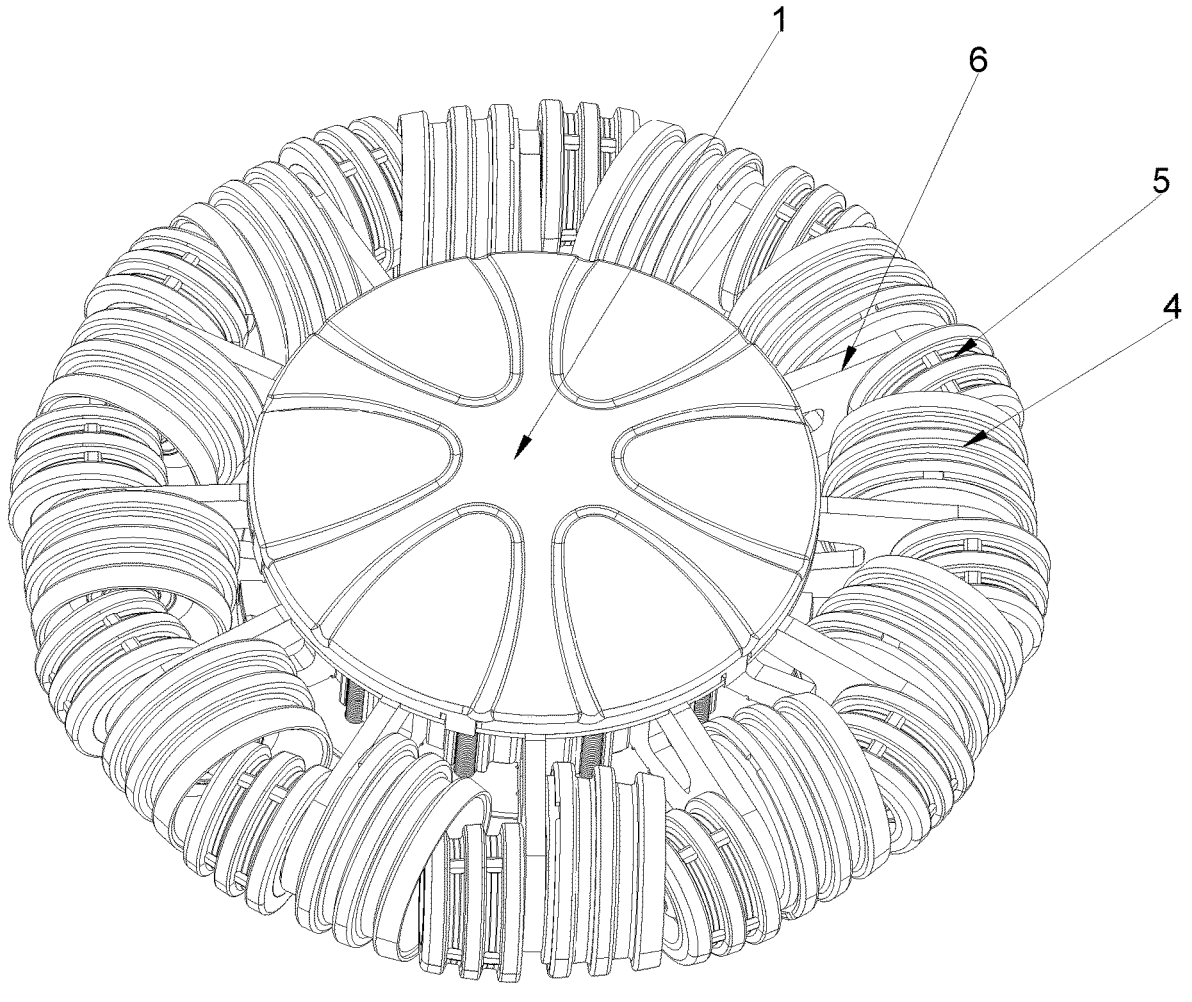
FIG. 6 is a structural diagram of a universal wheel in the embodiment of the invention.
Figure 7:
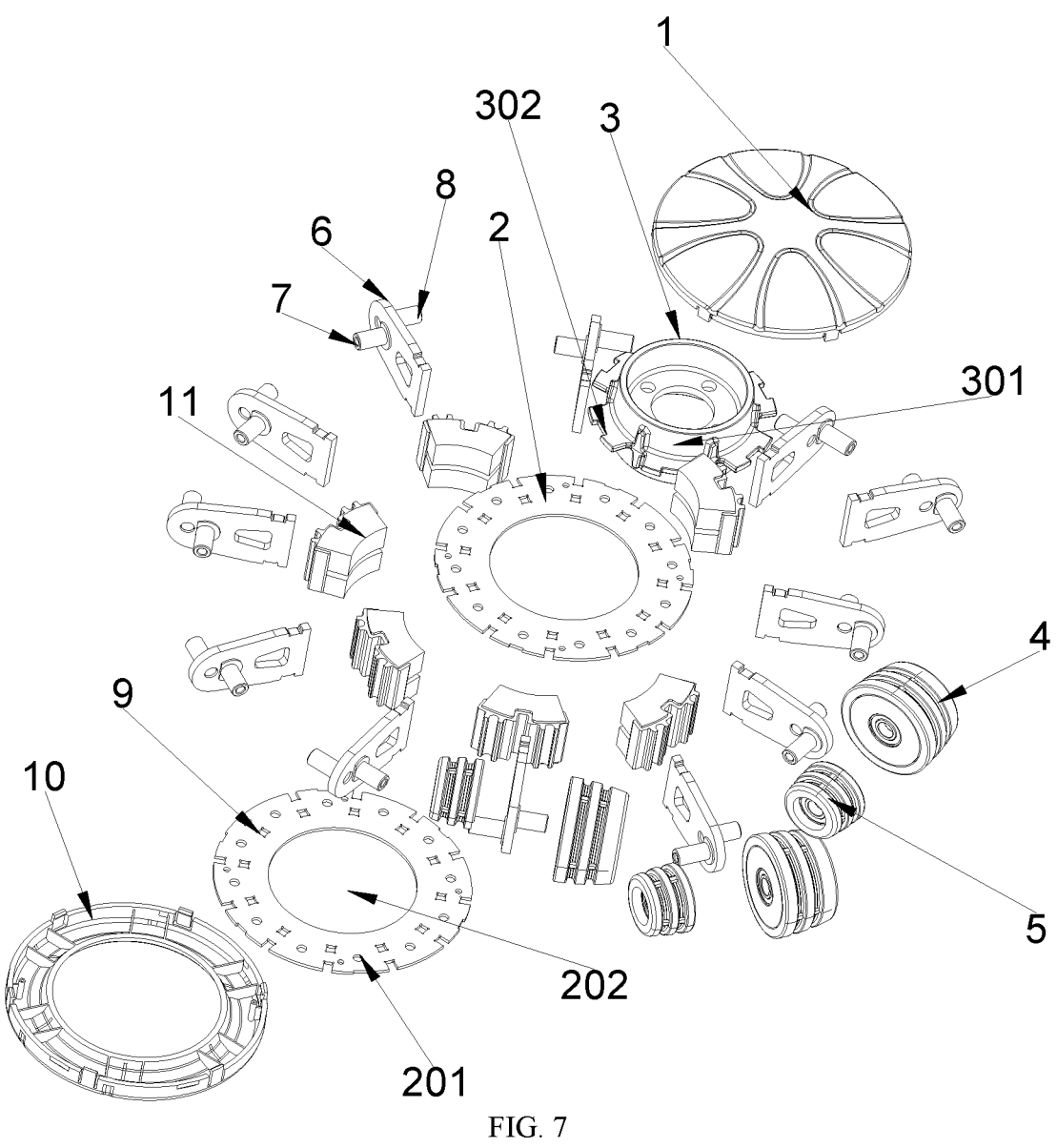
FIG. 7 is an exploded view of the universal wheel in the embodiment of the invention.
Figure 8:
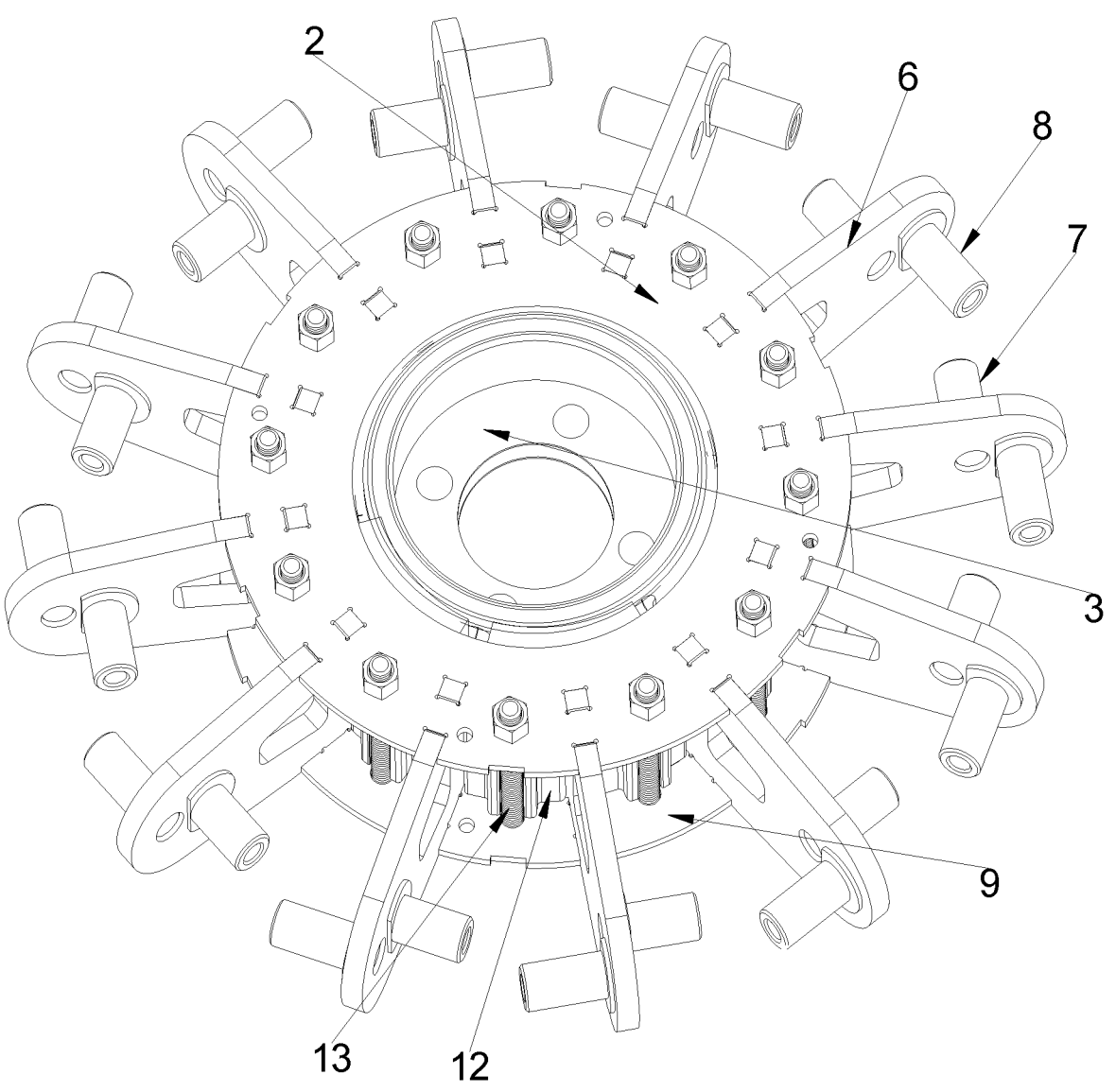
FIG. 8 is an assembled diagram of an axial drive connector and the axial fixing plate in the embodiment of the invention.
Figure 9:
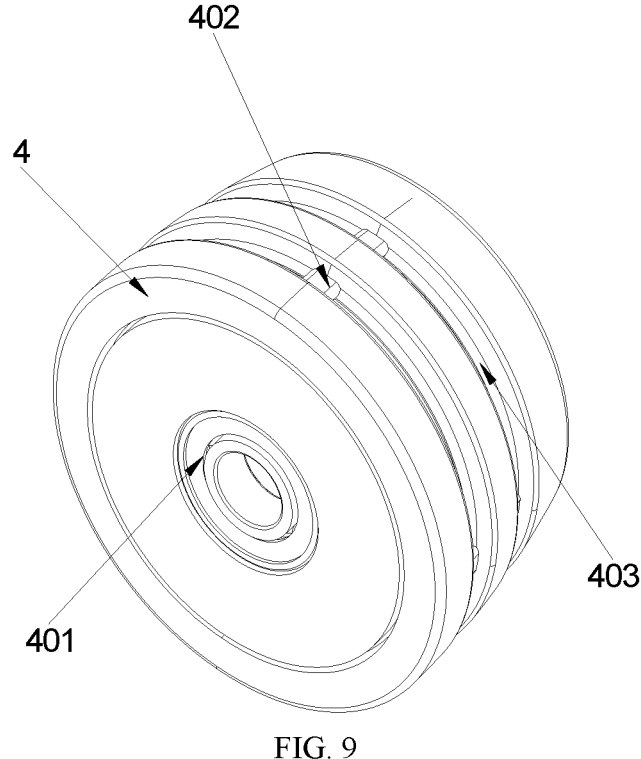
FIG. 9 is a structural diagram of a big wheel in the embodiment of the invention.
Figure 10:
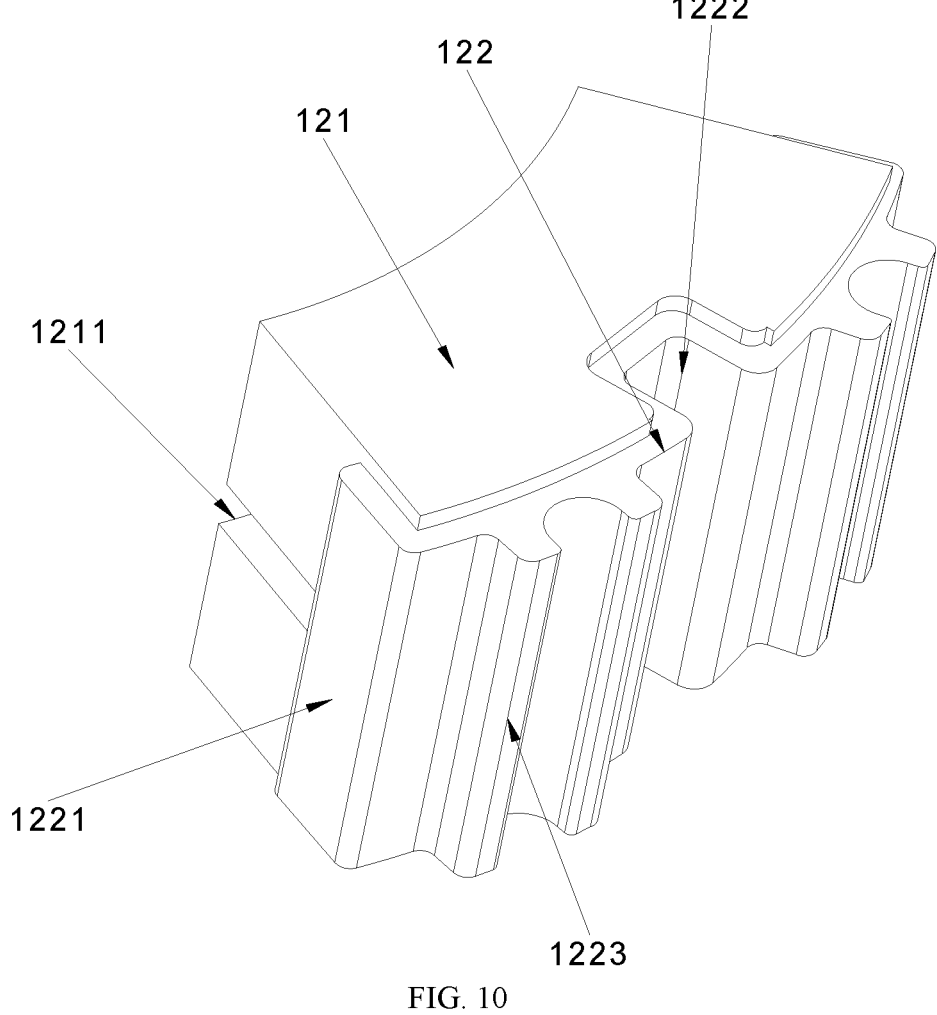
FIG. 10 is a structural diagram of a shock-proof component in the embodiment of the invention.

As shown in FIG. 1 to FIG. 10, this embodiment provides a welding shaft for a universal wheel. The welding shaft for a universal wheel comprises a big wheel welding shaft 7 and a small wheel welding shaft 8, wherein the big wheel welding shaft 7 comprises a big wheel welding shaft body 701, a big wheel welding shaft retainer ring 703 and a big wheel welding shaft fixing head 702 which are sequentially assembled into a whole, and the small wheel welding shaft 8 comprises a small wheel welding shaft body 801, a small wheel welding shaft retainer ring 803 and a small wheel welding shaft fixing head 802 which are sequentially assembled into a whole.

Compared with the prior art, the welding shaft for a universal wheel of the invention has the following beneficial effects:

In this technical solution, the welding shaft comprises the big wheel welding shaft 7 and the small wheel welding shaft 8, wherein the big wheel welding shaft 7 comprises the big wheel welding shaft body 701, the big wheel welding shaft retainer ring 703 and the big wheel welding shaft fixing head 702 which are sequentially assembled into a whole, the small wheel welding shaft 8 comprises the small wheel welding shaft body 801, the small wheel welding shaft retainer ring 803 and the small wheel welding shaft fixing head 802 which are sequentially assembled into a whole, and different wheels correspond to different shaft bodies, so that the layout is more reasonable, touchdown points of a big wheel and a small wheel are regularly distributed on the same circumference, stress is uniform, transition is smoother, turning is more accurate, slipping is less unlikely to occur, abrasion is small, the service life is long, and production and maintenance costs are reduced.

As shown in FIG. 1 to FIG. 10, in an optional solution of this embodiment:

The big wheel welding shaft body 701, the big wheel welding shaft retainer ring 703 and the big wheel welding shaft fixing head 702 are located on the same axis.

The small wheel welding shaft body 801, the small wheel welding shaft retainer ring 803 and the small wheel welding shaft fixing head 802 are located on the same axis.

The length of the big wheel welding shaft body 701 is greater than that of the small wheel welding shaft body 801.

The retainer ring is beneficial to welding and fixation. The two welding shaft bodies are of different lengths, so that wheels of different sizes can be installed and balanced.

Preferably, the big wheel welding shaft retainer ring 703 is in the shape of an incomplete circle;

The small wheel welding shaft retainer ring 803 is in the shape of an incomplete circle;

The incomplete circle shape is beneficial for the design of receding holes and can facilitate machining and installation.

This embodiment further provides a wheel assembly, which comprises a wheel shaft fixing plate 6, a big wheel 4, a small wheel 5, and the welding shaft for a universal wheel mentioned above, wherein a big wheel shaft fixing hole 601 and a small wheel shaft fixing hole 602 are formed in the surface of the wheel shaft fixing plate 6, are close to a head of the wheel shaft fixing plate 6 and are distributed in a lengthwise direction of the wheel shaft fixing plate 6, the distance from the big wheel shaft fixing hole 601 to the head of the wheel shaft fixing plate 6 is greater than the distance from the small wheel shaft fixing hole 602 to the head of the wheel shaft fixing plate 6, the big wheel welding shaft fixing head 702 of the big wheel welding shaft 7 is inserted into the big wheel shaft fixing hole 601 from one surface of the wheel shaft fixing plate 6 and is fixedly connected to the big wheel shaft fixing hole 601 through welding, the small wheel welding shaft fixing head 802 of the small wheel welding shaft 8 is inserted into the small wheel shaft fixing hole 602 from the other surface of the wheel shaft fixing plate 6 and is fixedly connected to the small wheel shaft fixing hole 602 through welding, the big wheel 4 is connected to the big wheel welding shaft body 701 of the big wheel welding shaft 7, and the small wheel 5 is connected to the small wheel welding shaft body 801 of the small wheel welding shaft 8. Preferably, the distance between the big wheel shaft fixing hole 601 and the small wheel shaft fixing hole 602 corresponds to a diameter difference between the big wheel 4 and the small wheel 5, so that touchdown points of the big wheel 4 and the small wheel 5 are located on the same circumference.

Compared with the prior art, the wheel assembly of the invention has the following beneficial effects:

In this technical solution, the wheel assembly for a universal wheel comprises the wheel shaft fixing plate 6, the welding shaft, the big wheel 4 and the small wheel 5, and the welding shaft is the welding shaft for a universal wheel mentioned above; the distance from the big wheel shaft fixing hole 601 to the head of the wheel shaft fixing plate 6 is greater than the distance from the small wheel shaft fixing hole 602 to the head of the wheel shaft fixing plate 6, and different wheels correspond to different shaft bodies, so that the welding shaft of the wheel assembly is more reasonable in layout, can guarantee that the touchdown points of the big wheel and the small wheel are regularly distributed on the same circumference, is uniform in stress, smoother in transition, more accurate in turning, not prone to slipping, small in abrasion and long in service life, and can reduce production and maintenance costs. Meanwhile, through the cooperation of the holes, the welding shaft fixing heads and the retainer rings, the shaft and the plate can be easily positioned when welded, deviation is unlikely to occur, and welding is easy.

As shown in FIG. 1 to FIG. 10, in an optional solution of this embodiment, the wheel shaft fixing plate 6 is in the shape of an isosceles trapezoid.

The head of the wheel shaft fixing plate 6 is arc.

A lightening hole 603 is formed in the surface of the wheel shaft fixing plate 6 and is closed to a tail of the wheel shaft fixing plate 6.

Clamping grooves 604 are symmetrically formed in two sides of the wheel shaft fixing plate 6 and are close to the tail of the wheel shaft fixing plate 6.

The clamping grooves 604 are rectangular.

Receding grooves 605 which extend inwards are formed in two sides of the bottom of each clamping groove 604.

The big wheel welding shaft fixing head 702 of the big wheel welding shaft 7 is fixed to the wheel shaft fixing plate 6 through welding.

The small wheel welding shaft fixing head 802 of the small wheel welding shaft 8 is fixed to the wheel shaft fixing plate 6 through welding.

The wheel shaft fixing plate 6 can be in different shapes as required, and the lightening hole 603 can effectively reduce the weight. The wheel shaft fixing plate 6 can be clamped with the fixing plates on inner and outer sides through the clamping grooves 604.

As shown in FIG. 1 to FIG. 10, in an optional solution of this embodiment, the big wheel 4 is rotatably connected to the big wheel welding shaft body 701 through big wheel bearings 401.

The small wheel 5 is rotatably connected to the small wheel welding shaft body 801 through small wheel bearings.

By using the bearings for connection, smooth, stable and quick rotation can be achieved. Preferably, the big wheel bearings 401 are disposed at two ends of the big wheel 2, and the small wheel bearings are disposed at two ends of the small wheel 5.

Furthermore, the big wheel 4 is connected to the big wheel welding shaft body 701 in a riveted manner through the big wheel bearings 401.

The small wheel 5 is connected to the small wheel welding shaft body 801 in a riveted manner through the small wheel bearings.

By connecting the wheels and the shaft bodies in a riveted manner through a riveting machine, assembly is faster and easier, the production efficiency is improved, the production cost is reduced, and mass production is facilitated.

Or, a big wheel fixing threaded hole 704 is formed in the center of an end face of the big wheel welding shaft body 701.

A small wheel fixing threaded hole 804 is formed in the center of an end face of the small wheel welding shaft body 801.

The big wheel fixing threaded hole 704 is matched with a corresponding big wheel fixing screw to fix the big wheel 4.

The small wheel fixing threaded hole 804 is matched with a corresponding small wheel fixing screw to fix the small wheel 5.

Threaded fixation is convenient and firm, and both assembly and disassembly are easy.

As shown in FIG. 1 to FIG. 10, in an optional solution of this embodiment, the diameter and length of the big wheel 4 are greater than those of the small wheel 5.

The diameter of the big wheel is designed to be different from that of the small wheel, so that the touchdown points of the big wheel and the small wheel are located on the same circumference to make traveling steadier.

As shown in FIG. 1 to FIG. 10, in an optional solution of this embodiment, abrasion prompt signs 402 are disposed on the big wheel 4 and the small wheel 5.

Users can make a judgment as to whether rubber wheels needs to be changed according to the abrasion prompt signs 402 on the rubber wheels, so that slipping of a wheelchair caused by delayed replacement of the rubber wheels is avoided, and waste caused by excessively frequent replacement of the rubber wheels is also avoided.

Furthermore, anti-slip grooves 403 are formed in an outer surface of the big wheel 4 and an outer surface of the small wheel 5, and the abrasion prompt signs 402 are disposed in the anti-slip grooves 403.

Users can make an observation and a judgment easily. Particularly, the users can know the degree of abrasion of the anti-slip grooves 403 by observing the depth of top surfaces of the abrasion prompt signs 402 in the anti-slip grooves 403. When the top surfaces of the abrasion prompt signs 402 in the anti-slip grooves 403 are flush with the outer surfaces of the rubber wheels, the users can instantly make a judgment that the rubber wheels need to be changed Furthermore, the abrasion prompt signs 402 are protrusions which are located in the anti-slip grooves 403 and stretch out from bottom surfaces of the anti-slip grooves 403 in a radial direction, and the height of the protrusions is half of the depth of the anti-slip grooves 403.

In this way, the abrasion prompt signs 402 are effectively prevented from falling, and the difference between the height of the protrusions and the depth of the anti-slip grooves 403 is a safety distance. In the using process, when the top surfaces of the abrasion prompt signs 402 are flush with the outer surface of the rubber wheels, the users can immediately make a judgment that the rubber wheels need to be changed.

Preferably, multiple anti-slip grooves 403 are formed in each of the big wheel 4 and the small wheel 5, and multiple abrasion prompt signs 402 are disposed in each anti-slip groove 403; the number of the abrasion prompt signs 402 in each anti-slip grooves 403 is equal to that of the abrasion prompt signs in the other anti-slip grooves 403; and the abrasion prompt signs 402 are uniformly distributed in the anti-slip grooves 403.

The abrasion prompt signs 402 are distributed in the grooves, so that the situation that when some grooves of the rubber wheels are abraded, while the other grooves are not abraded, the users only observe the non-abraded abrasion prompt signs 402 due to the lack of the abrasion prompt signs 402 in the abraded grooves, and consequentially fail to change the rubber times timely is avoided.

Preferably, the big wheel 4 and the small wheel 5 are rubber wheels.

The big wheel 4 and the small wheel 5 may be rubber wheels, metal wheels or wheels made of other materials as required.

The touchdown points of the big wheel and the small wheel are located on the same circumference, so that driving is steadier, bumps are avoided, smooth traveling is realized, the comfort is better, and the situation that some wheels are severely abraded, and some wheels are not abraded in the prior art is avoided.

This embodiment further provides a universal wheel which comprises an outer protection plate 1, an outer fixing plate 2, an inner fixing plate 9, an inner protection plate 10, a wheel shaft drive connector 3, multiple wheel assemblies and multiple shock absorption assemblies 11, wherein the wheel shaft drive connector 3 is connected to the multiple wheel assemblies through the outer fixing plate 2, the inner fixing plate 9 and the multiple shock absorption assemblies 11, the outer protection plate 1 is fixed to an outer side of the outer fixing plate 2, the inner protection plate 10 is fixed to an inner side of the inner fixing plate 9, and each of the multiple wheel assemblies is the wheel assembly for a universal wheel mentioned above.

By adoption of the wheel assembly comprising the welding shaft mentioned above, the touchdown points of the big wheel and the small wheel are regularly distributed on the same circumference, stress is uniform, transition is smoother, turning is more accurate, slipping is unlikely to occur, abrasion is small, the service life is long, and production and maintenance costs are reduced. Moreover, all parts of the assembly are detachably connected, so that the elements can be changed and can be easily repaired when damaged.

As shown in FIG. 1 to FIG. 10, in an optional solution of this embodiment, the multiple wheel assemblies are regularly disposed around the wheel shaft drive connector 3.

The multiple big wheels 4 and the multiple small wheels 5 are disposed alternately.

The big wheels 4 and the small wheels 5 are disposed alternately, so that the whole universal wheel can be stressed more uniformly and can run more smoothly in the traveling process.

Furthermore, touchdown points of the multiple big wheels and the multiple small wheels are located on the same circumference.

As shown in FIG. 1 to FIG. 10, in an optional solution of this embodiment, the number of the wheel assemblies is twelve, ten, eight or six.

The number of the shock absorption assemblies 11 is twelve, ten, eight or six.

Different numbers of wheel assemblies and shock absorption assemblies can be configured as needed.

As shown in FIG. 1 to FIG. 10, in an optional solution of this embodiment, the multiple shock absorption assemblies 11 are regularly disposed in a circumferential direction of the wheel shaft drive connector 3.

Each shock absorption assembly 11 comprises a shock-proof component 12 and a limiting component 13, wherein the limiting component 13 for restraining the shock-proof component 12 from moving is disposed on a side, away from the wheel shaft drive connector 3, of the shock-proof component 12.

The shock absorption assemblies 11 are regularly disposed, so that uniform shock absorption is realized, and shocks can be effectively reduced when the whole universal wheel rotates again. Wastage and abrasion of parts are reduced, and the comfort of users is improved.

Furthermore, the shock-proof component 12 comprises a sponge cushion 121 and a sponge support 122, wherein the sponge cushion 121 is fixedly connected to the sponge support 122.

The sponge cushion 121 is supported by the sponge support 122 to fulfill shock absorption, so that the shock absorption effect of the sponge cushion 121 is good, and shocks can be effectively avoided.

Furthermore, the sponge cushion 121 is of an arc block structure, and the curvature of an inner side of the sponge cushion 121 is equal to that of an outer side of the sponge cushion 121.

By adoption of the arc block structure, the sponge cushion 121 can be disposed around the wheel shaft drive connector 3; and the curvature of the inner side of the sponge cushion is equal to that of the outer side of the sponge cushion, so that the sponge cushion can be arranged more easily.

Furthermore, a main part of the sponge support 122 is of an arc plate structure, the curvature of an inner side of the sponge support 122 corresponds to the curvature of the outer side of the sponge cushion 121, and the outer side of the sponge cushion 121 is attached to the inner side of the sponge support 122; and protruding edges 1221 which protrude towards the inner side of the sponge support 122 are disposed at two ends of the sponge support 122 and include a left protruding edge disposed at a left end of the sponge support 122 and a right protruding edge disposed at a right end of the sponge support 122; an angle between the left protruding edge and the main part of the sponge support 122 corresponds to an angle between the outer side of the sponge cushion 121 and the left side of the sponge cushion 121, and an angle between the right protruding edge and the main part of the sponge support 122 corresponds to an angle between the outer side of the sponge cushion 121 and the right side of the sponge cushion 121; the inner side of the left protruding edge of the sponge support 122 is attached to the left side of the sponge cushion 121, and the inner side of the right protruding edge of the sponge support 122 is attached to the right side of the sponge cushion 121; the sponge cushion 121 is clamped on the sponge support 122.

The sponge cushion 121 is clamped by the protruding edges 1221 on two sides, so that the sponge cushion 121 is not prone to falling. The curvature of the inner side of the sponge support 122 corresponds to the curvature of the outer side of the sponge cushion 121, so that the sponge cushion 121 can be supported more effectively.

Preferably, multiple shock absorption grooves 301 are regularly formed in the peripheral side of the wheel shaft drive connector 3; the multiple sponge cushions 121 are clamped in the multiple shock absorption grooves 301 in a one-to-one corresponding manner, bottom surfaces of the shock absorption grooves 301 are consistent with the inner sides of the sponge cushions 121 in curvature and correspond to the inner sides of the sponge cushions in size, and the left walls the shock absorption grooves 301 are consistent with the left sides of the sponge cushions 121 in gradient and correspond to the left sides of the sponge cushions 121; the sponge cushions 121 are in interference fit with the shock absorption grooves 301.

The sponge cushions 121 are clamped in the shock absorption grooves 301 through interference fit, so that the sponge cushions 121 are not prone to falling and are effectively fixed, and a shock absorption effect is realized.

Furthermore, anti-shake protrusions 302 are disposed on the bottom surfaces of the shock absorption grooves 301, anti-shake grooves 1211 are formed in the inner sides of the sponge cushions 121, and the anti-shake protrusions 302 are clamped in the anti-shake grooves 1211.

Through the cooperation of the anti-shake grooves 1211 and the anti-shake protrusions 302, the sponge cushions 121 can be fixed more effectively and are not prone to shaking.

Optionally, a fixing plate groove 1222 is formed in the outer side of each sponge support 122.

Tails of the multiple wheel shaft fixing plates 6 are inserted into the fixing plate grooves 1222 in a one-to-one corresponding manner.

In this way, the wheel shaft fixing plates 6 can be installed and limited easily, and are damped and limited. Preferably, bottoms of the fixing plate grooves 1222 are inlaid in the outer walls of the sponge cushions 121, so that more effective shock absorption is realized.

As shown in FIG. 1 to FIG. 10, in an optional solution of this embodiment, the outer fixing plate 2 is detachably connected to the wheel shaft drive connector 3, and the inner fixing plate 9 is detachably connected to the wheel shaft drive connector 3; the shock-proof components 12 are disposed between the outer fixing plate 2 and the inner fixing plate 9.

The limiting components 13 are fixed between the outer fixing plate 2 and the inner fixing plate 9.

All the components are detachably connected, so that the elements can be disassembled and changed more conveniently and can be repaired after being damaged.

Preferably, the limiting components 13 are limiting bolts or limiting rods.

Each shock-proof component 12 comprises a sponge cushion 121 and a sponge support 122, wherein columnar protrusions 1223 are disposed on the outer side of the sponge support 122, and each sponge support 122 comprises four columnar protrusions 1223; every two columnar protrusions 1223 are paired, one pair of columnar protrusion 1223 is disposed at a left end of the sponge support 122, the other pair of columnar protrusion 1223 is disposed at a right end of the sponge support 122, and the two pairs of columnar protrusions 1223 are symmetrical; the distances between the two columnar protrusions 1223 in all pairs are consistent, the two columnar protrusions 1223 in each pair are parallel to each other, and an arc surface is formed between opposite sides of the two columnar protrusions 1223 in each pair and has an inner diameter corresponding to an outer diameter of the limiting bolts or the limiting rods.

Through holes 201 are formed in the outer fixing plate 2 and correspond to the limiting bolts or the limiting rods, and through holes 201 are formed in the inner fixing plate 9 and correspond to the limiting bolts or the limiting rods.

The limiting bolts or the limiting rods sequentially penetrate through the through holes 201 in the outer fixing plate 2 and the through holes in the inner fixing plate 9 and are surrounded by the arc surfaces.

The shock absorption components and the shaft wheel fixing plates 6 are fixed through the limiting bolts or the limiting rods, so that the whole device is easy to disassemble. Moreover, the arc surfaces can fulfill a positioning and limiting effect.

Furthermore, circular through holes 202 are formed in the center of the outer fixing plate 2 and in the center of the inner fixing plate 9, and the inner diameter of the circular through holes 202 corresponds to the outer diameter of the main part of the wheel shaft drive connector 3; the outer fixing plate 2 is clamped and connected to the wheel shaft drive connector 3, and the inner fixing plate 9 is clamped and connected to the wheel shaft drive connector 3; the wheel shaft drive connector 3, the outer fixing plate 2 and the inner fixing plate 9 are arranged coaxially.

Through clamping, disassembly is convenient; and the fixing plates on the two sides are detachably fixed, thus being firm and easy to disassemble.

Furthermore, the outer fixing plate 2 and the inner fixing plate 9 are clamped in the clamping grooves 604 in the two sides of the wheel shaft fixing plates 6.

Through clamping, the wheel shaft fixing plates 6 can be fixed easily and firmly and are convenient to disassemble.

Finally, it should be noted that the application is not limited to the details of the illustrative embodiments mentioned above, and those skilled in the art can implement the application in other specific forms without departing from the spirit or basic features of the application. Therefore, for every point, the aforesaid embodiments are illustrative instead of being restrictive, the scope of the application is defined by the appended claims instead of the above description, and the application is intended to include all variations with the meanings of equivalent elements of the claims or within the scope defined by the claims.

In addition, it should be noted that although the invention has been described with reference to embodiments, not every embodiment includes only one independent technical solution, and the narration way in the specification is merely for the purpose of clear description. Those skilled in the art would regard the specification as a whole and can obtain other appreciable embodiments by properly combining the technical solutions in the embodiments.

What is claimed is:

1. A welding shaft for a universal wheel, comprising a big wheel welding shaft and a small wheel welding shaft, wherein the big wheel welding shaft comprises a big wheel welding shaft body, a big wheel welding shaft retainer ring, and a big wheel welding shaft fixing head, wherein the big wheel welding shaft body, the big wheel welding shaft retainer ring, and the big wheel welding shaft fixing head are sequentially assembled into a whole, and the small wheel welding shaft comprises a small wheel welding shaft body, a small wheel welding shaft retainer ring, and a small wheel welding shaft fixing head, wherein the small wheel welding shaft body, the small wheel welding shaft retainer ring, and the small wheel welding shaft fixing head are sequentially assembled into a whole.

2. The welding shaft for the universal wheel according to claim 1, wherein the big wheel welding shaft body, the big wheel welding shaft retainer ring, and the big wheel welding shaft fixing head are located on a same first axis;

the small wheel welding shaft body, the small wheel welding shaft retainer ring, and the small wheel welding shaft fixing head are located on a same second axis;

a length of the big wheel welding shaft body is greater than a length of the small wheel welding shaft body.

3. The welding shaft for the universal wheel according to claim 2, wherein the big wheel welding shaft retainer ring is in a shape of an incomplete circle;

the small wheel welding shaft retainer ring is in the shape of the incomplete circle.

4. A wheel assembly for a universal wheel, comprising a wheel shaft fixing plate, a big wheel, a small wheel, and the welding shaft for the universal wheel according to claim 1, wherein a big wheel shaft fixing hole and a small wheel shaft fixing hole are formed in a surface of the wheel shaft fixing plate and are distributed at a head of the wheel shaft fixing plate and are distributed in a lengthwise direction of the wheel shaft fixing plate;

the big wheel shaft fixing hole and the small wheel shaft fixing hole are distributed in the lengthwise direction of the wheel shaft fixing plate, a distance from the big wheel shaft fixing hole to a head of the wheel shaft fixing plate is greater than a distance from the small wheel shaft fixing hole to the head of the wheel shaft fixing plate;

the big wheel welding shaft fixing head of the big wheel welding shaft is inserted into the big wheel shaft fixing hole from a first surface of the wheel shaft fixing plate and is fixedly connected to the big wheel shaft fixing hole through welding, the small wheel welding shaft fixing head of the small wheel welding shaft is inserted into the small wheel shaft fixing hole small wheel shaft fixing hole from a second surface of the wheel shaft fixing plate and is fixedly connected to the small wheel shaft fixing hole through welding;

the big wheel is connected to the big wheel welding shaft body of the big wheel welding shaft, and the small wheel is connected to the small wheel welding shaft body of the small wheel welding shaft.

5. The wheel assembly for the universal wheel according to claim 4, wherein a lightening hole is formed in the surface of the wheel shaft fixing plate and is distributed at a tail of the wheel shaft fixing plate;

clamping grooves are symmetrically formed in two sides of the wheel shaft fixing plate and are distributed at the tail of the wheel shaft fixing plate;

the clamping grooves are rectangular;

receding grooves extending inwards are formed in two sides of a bottom of each of the clamping grooves;

the big wheel welding shaft fixing head of the big wheel welding shaft is fixed to the wheel shaft fixing plate through welding;

the small wheel welding shaft fixing head of the small wheel welding shaft is fixed to the wheel shaft fixing plate through welding.

6. The wheel assembly for the universal wheel according to claim 5, wherein the wheel shaft fixing plate is in the shape of an isosceles trapezoid;

a head of the wheel shaft fixing plate is arc-shaped.

7. The wheel assembly for the universal wheel according to claim 4, wherein the big wheel is rotatably connected to the big wheel welding shaft body through a big wheel bearing;

the small wheel is rotatably connected to the small wheel welding shaft body through a small wheel bearing.

8. The wheel assembly for the universal wheel according to claim 7, wherein the big wheel is connected to the big wheel welding shaft body in a riveted manner through the big wheel bearing;

the small wheel is connected to the small wheel welding shaft body in a riveted manner through the small wheel bearing.

9. The wheel assembly for the universal wheel according to claim 7, wherein a big wheel fixing threaded hole is formed in a center of an end face of the big wheel welding shaft body;

a small wheel fixing threaded hole is formed in a center of an end face of the small wheel welding shaft body;

the big wheel fixing threaded hole is matched with a corresponding big wheel fixing screw to fix the big wheel;

the small wheel fixing threaded hole is matched with a corresponding small wheel fixing screw to fix the small wheel.

10. The wheel assembly for the universal wheel according to claim 4, wherein a diameter of the big wheel is greater than a diameter of the small wheel, and a length of the big wheel is greater than a length of the small wheel.

11. The wheel assembly for the universal wheel according to claim 4, wherein abrasion prompt signs are disposed on the big wheel and the small wheel.

12. The wheel assembly for the universal wheel according to claim 11, wherein anti-slip grooves are formed in an outer surface of the big wheel and an outer surface of the small wheel, and the abrasion prompt signs are disposed in the anti-slip grooves.

13. The wheel assembly for the universal wheel according to claim 12, wherein the abrasion prompt signs are protrusions, the protrusions are located in the anti-slip grooves and stretch out from bottom surfaces of the anti-slip grooves in a radial direction, and a height of the protrusions is half of a depth of the anti-slip grooves.

14. The wheel assembly for the universal wheel according to claim 12, wherein a plurality of the anti-slip grooves are formed in each of the big wheel and the small wheel, and a plurality of the abrasion prompt signs are disposed in each of the plurality of the anti-slip grooves;

a number of the plurality of the abrasion prompt signs is the same in each of the plurality of the anti-slip grooves; and the plurality of the abrasion prompt signs are uniformly distributed in the plurality of the anti-slip grooves.

15. The wheel assembly for the universal wheel according to claim 4, wherein the big wheel and the small wheel are rubber wheels.

16. A universal wheel, comprising an outer protection plate, an outer fixing plate, an inner fixing plate, an inner protection plate, a wheel shaft drive connector, a plurality of wheel assemblies, and a plurality of shock absorption assemblies, wherein the wheel shaft drive connector is connected to the plurality of wheel assemblies through the outer fixing plate, the inner fixing plate, and the plurality of shock absorption assemblies, the outer protection plate is fixed to an outer side of the outer fixing plate, the inner protection plate is fixed to an inner side of the inner fixing plate, and each of the plurality of wheel assemblies is the wheel assembly for the universal wheel according to claim 4.

17. The universal wheel according to claim 16, wherein the plurality of wheel assemblies are regularly disposed around the wheel shaft drive connector; and a plurality of the big wheel and a plurality of the small wheel are disposed alternately.

18. The universal wheel according to claim 17, wherein touchdown points of the plurality of the big wheel and the plurality of the small wheel are located on a same circumference.

19. The universal wheel according to claim 18, wherein the plurality of shock absorption assemblies are regularly disposed in a circumferential direction of the wheel shaft drive connector;

each of the plurality of shock absorption assemblies comprises a shock-proof component and a limiting component, wherein the limiting component is configured for restraining the shock-proof component from moving, and the limiting component is disposed on a side, away from the wheel shaft drive connector, of the shock-proof component.

20. The universal wheel according to claim 19, wherein the shock-proof component comprises a sponge cushion and a sponge support, and the sponge cushion is fixedly connected to the sponge support.

21. The universal wheel according to claim 20, wherein the sponge cushion is of an arc block structure, and a curvature of an inner side of the sponge cushion is equal to a curvature of an outer side of the sponge cushion.

22. The universal wheel according to claim 21, wherein a main part of the sponge support is of an arc plate structure, a curvature of an inner side of the sponge support corresponds to the curvature of the outer side of the sponge cushion, and the outer side of the sponge cushion is attached to the inner side of the sponge support; two sides of the sponge support along the circumference of the wheel shaft drive connector are respectively designated as the left side and right side; protruding edges which protrude towards the inner side of the sponge support are disposed at two ends of the sponge support, and the protruding edges comprise a left protruding edge disposed at a left end of the sponge support and a right protruding edge disposed at a right end of the sponge support;

an angle between the left protruding edge and the main part of the sponge support corresponds to an angle between the outer side of the sponge cushion and a left side of the sponge cushion, and an angle between the right protruding edge and the main part of the sponge support corresponds to an angle between the outer side of the sponge cushion and a right side of the sponge cushion;

an inner side of the left protruding edge of the sponge support is attached to the left side of the sponge cushion, and an inner side of the right protruding edge of the sponge support is attached to the right side of the sponge cushion; and the sponge cushion is clamped on the sponge support.

23. The universal wheel according to claim 21, wherein a plurality of shock absorption grooves are regularly formed in a peripheral side of the wheel shaft drive connector;

a plurality of the sponge cushion are clamped in the plurality of shock absorption grooves in a one-to-one corresponding manner, bottom surfaces of the plurality of shock absorption grooves are consistent with the inner side of the sponge cushion in the curvature and correspond to the inner side of the sponge cushion in size, two sides of the shock absorption groove along the circumference of the wheel shaft drive connector are respectively designated as the left side and right side, two sides of the sponge cushion along the circumference of the wheel shaft drive connector are respectively designated as the left side and right side, and left walls the plurality of shock absorption grooves are consistent with J left side of the sponge cushion in gradient and correspond to the left side of the sponge cushion; and the plurality of the sponge cushion are in interference fit with the plurality of shock absorption grooves.

24. The universal wheel according to claim 23, wherein anti-shake protrusions are disposed on the bottom surfaces of the plurality of shock absorption grooves, anti-shake grooves are formed in the inner side of the plurality of the sponge cushion, and the anti-shake protrusions are clamped in the anti-shake grooves.

25. The universal wheel according to claim 20, wherein a fixing plate groove is formed in an outer side of each of the sponge support;

a tail of the wheel shaft fixing plate is inserted into the fixing plate groove in a one-to-one corresponding manner.

26. The universal wheel according to claim 19, wherein the outer fixing plate is detachably connected to the wheel shaft drive connector, and the inner fixing plate is detachably connected to the wheel shaft drive connector;

the shock-proof component is disposed between the outer fixing plate and the inner fixing plate; and the limiting component is fixed between the outer fixing plate and the inner fixing plate.

27. The universal wheel according to claim 26, wherein the limiting component is a limiting bolt or a limiting rod;

each of the shock-proof component comprises a sponge cushion and a sponge support, two sides of the sponge support along the circumference of the wheel shaft drive connector are respectively designated as the left side and right side;

wherein columnar protrusions are disposed on an outer side of the sponge support, and each of the sponge support comprises four of the columnar protrusions;

the four columnar protrusions form two pairs of the columnar protrusions, a first pair of the columnar protrusions are disposed at a left end of the sponge support, a second pair of the columnar protrusions are disposed at a right end of the sponge support, and the two pairs of the columnar protrusions are symmetrical;

a distance between the two columnar protrusions in each of the first pair of the columnar protrusions and the second pair of the columnar protrusions are consistent, the two columnar protrusions in each pair are parallel to each other, and an arc surface is formed between opposite sides of the two columnar protrusions in each pair and has an inner diameter corresponding to an outer diameter of the limiting component;

first through holes are formed in the outer fixing plate and correspond to the limiting component, and second through holes are formed in the inner fixing plate and correspond to the limiting component;

the limiting component sequentially penetrates through the first through holes in the outer fixing plate and the second through holes in the inner fixing plate and are surrounded by the arc surface.

28. The universal wheel according to claim 26, wherein circular through holes are formed in a center of the outer fixing plate and in a center of the inner fixing plate, and an inner diameter of the circular through holes corresponds to an outer diameter of a main part of the wheel shaft drive connector;

the outer fixing plate is clamped and connected to the wheel shaft drive connector, and the inner fixing plate is clamped and connected to the wheel shaft drive connector; and the wheel shaft drive connector, the outer fixing plate, and the inner fixing plate are arranged coaxially.

29. The universal wheel according to claim 26, wherein the outer fixing plate and the inner fixing plate are clamped in clamping grooves in two sides of the wheel shaft fixing plate.

* * * * *